INVENTOR
FRANCOIS JEAN COLAS

BY Kemon, Palmer, Stewart & Estabrook
ATTORNEYS

Oct. 17, 1967 F. J. P. M. COLAS 3,347,185
SYSTEM OF GOODS HANDLING BY MEANS OF FLEXIBLE PALLETS USING LIFT TRUCKS OR OTHER LIFTING DEVICES
Filed July 1, 1965 3 Sheets-Sheet 2
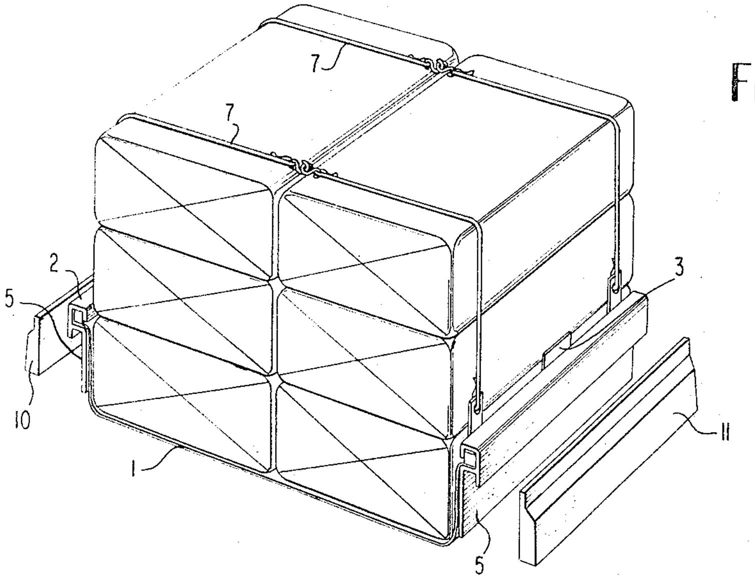
FIG.4
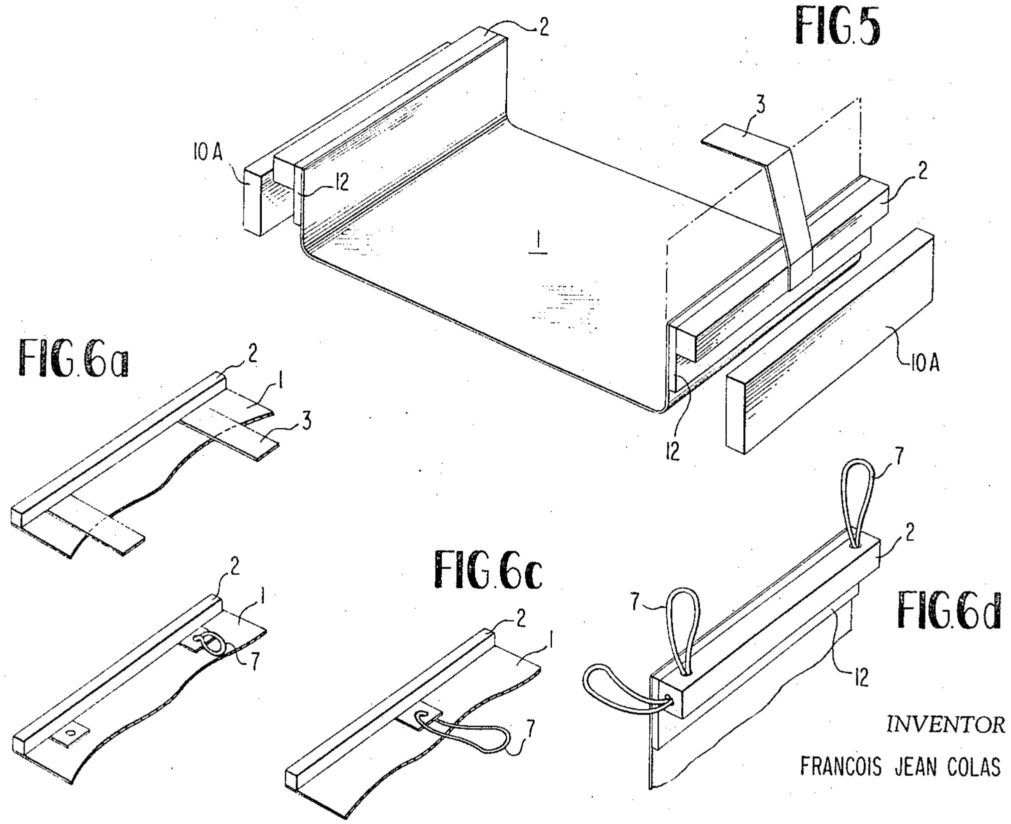
FIG.5 FIG.6a FIG.6c FIG.6d
FIG.6b
INVENTOR
FRANCOIS JEAN COLAS
BY Kemon, Palmer, Stewart & Estabrook
ATTORNEYS

INVENTOR
FRANCOIS JEAN COLAS

BY Kenyon, Palmer, Stewart & Estabrook
ATTORNEY

United States Patent Office 3,347,185

Patented Oct. 17, 1967

3,347,185

SYSTEM OF GOODS HANDLING BY MEANS OF FLEXIBLE PALLETS USING LIFT TRUCKS OR OTHER LIFTING DEVICES

Francois Jean Paul Marie Colas, Bourg La Reine, France

Filed July 1, 1965, Ser. No. 468,906
Claims priority, application France, July 4, 1964, 980,743
4 Claims. (Cl. 108—51)

ABSTRACT OF THE DISCLOSURE

Improved goods-handling pallets made of a flat flexible sheet; bordered on at least two extremities by projections to take mandrels enabling picking up. The mandrels may be fixed or movable. Means are provided for fastening so as to render the pallet and mandrels solid with the load.

Arrangement of trucks, cranes or transpallets to adapt them perfectly to this new type of goods handling.

This invention relates to pallets and more particularly, to pallets of the flexible type.

Load-supporting pallets adapted to be handled by fork lift trucks are well-known in the art, and many enjoy substantial commercial usage. Flexible pallets have also been proposed heretofore, but all of the flexible pallets of the prior art suffer from one or more drawbacks.

Accordingly, it is the principal object of the present invention to provide a flexible pallet useful with fork lift trucks.

A further object of the present invention is to provide a flexible pallet which can be shipped flat and which is extremely lightweight.

Other objects of the present invention will be apparent to those skilled in this art from a consideration of the following detailed description when read in conjunction with the attached sheets of drawings, in which:

FIGURE 4 is a perspective view of the pallet shown in the preceding figures, with a full load attached thereto;

FIGURE 5 shows a modification of the pallet shown in FIGURES 1 to 4 inclusive;

Figure 10A:
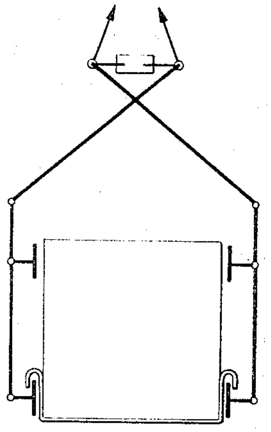
Figures 8A, 8B, 8C, 8D:
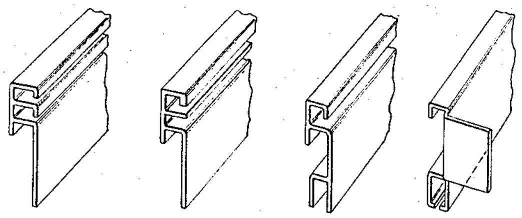
Figure 9:
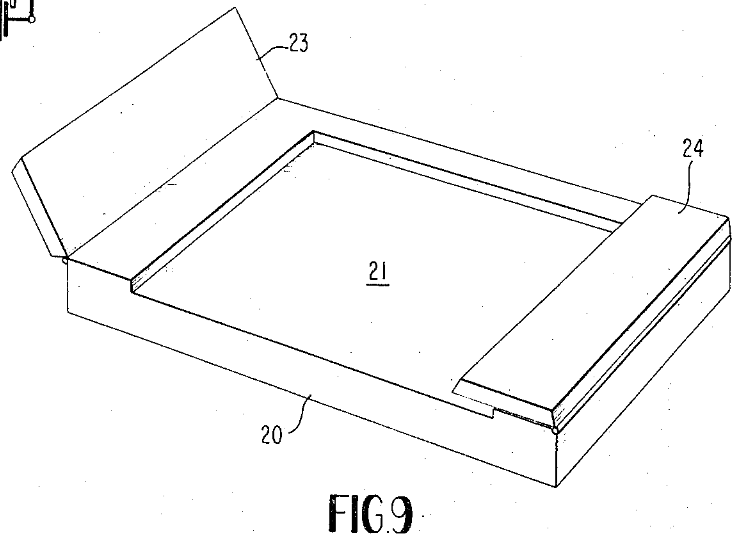
Figure 10B:
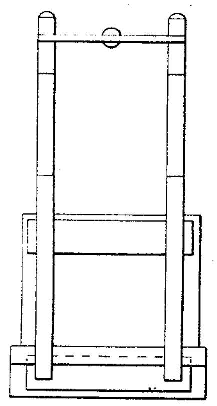

FIGURES 6*a* to 6*d* inclusive show alternative load attaching means;

FIGURES 7*a* to 7*e* inclusive show alternative forms of the mandrels of the present invention;

FIGURES 8*a* to 8*d* inclusive show further alternative embodiments of the mandrels of the present invention;

FIGURE 9 shows a jig which is useful to assemble a pallet of the present invention to a load; and FIGURES 10*a* and 10*b* are diagrammatic showings of sling arrangement useful for hoisting loads with pallets in accordance with the present invention.

In general, the objects of the present invention are achieved by forming a pallet from, for example, a flat sheet of aluminum or similar material having battens attached to two opposite edges of the sheet. A pair of channel members forming mandrels are then attached to the sheet portion by inserting the battens in channels provided on the mandrels. The surfaces of the mandrels which become uppermost in use, have attached along their upper edges, tie means securing the entire pallet to the load.

Figure 1:
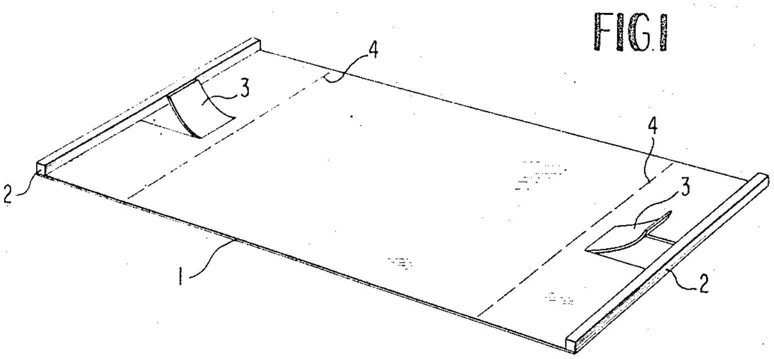
FIGURE 1 is a perspective view of the load-supporting portion of a pallet in accordance with the present invention.

Turning now to the drawings for a detailed description of the present invention, FIGURE 1 shows the flat flexible sheet 1, having battens 2 attached to two opposite edges of the sheet. Flexible tab portions 3 may extend inwardly from the battens for purposes which will appear hereinafter. The dotted lines 4 in FIGURE 1 indicate the approximate outer limits of the load to which the pallet is to be secured.

Figure 2:
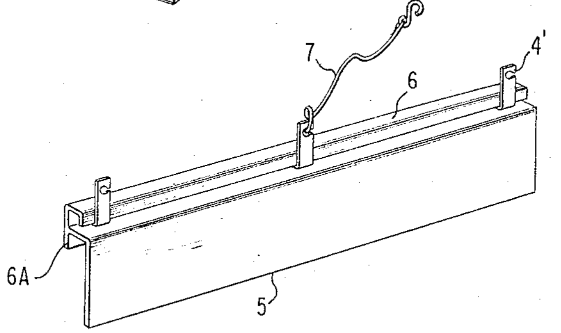
FIGURE 2 is a perspective view of one of the mandrels useful in connection with the load-supporting portion shown in FIGURE 1.

FIGURE 2 shows one of the mandrels which form the side members of the pallet in accordance with the present invention, and which mandrels are the members which are engaged by the tines of the fork lift truck in order to handle the load. It will be noted that the mandrel 5 includes a slide channel 6 into which the battens 2 of FIGURE 1 may be inserted to assemble the complete pallet. The downwardly-turned channel **6*a* provides a load-supporting surface, which is engaged by the tines of the fork lift truck during use. Attached to the upper surface of the mandrel is a tie means generally indicated at 7** in FIGURE 2.

Figure 3:
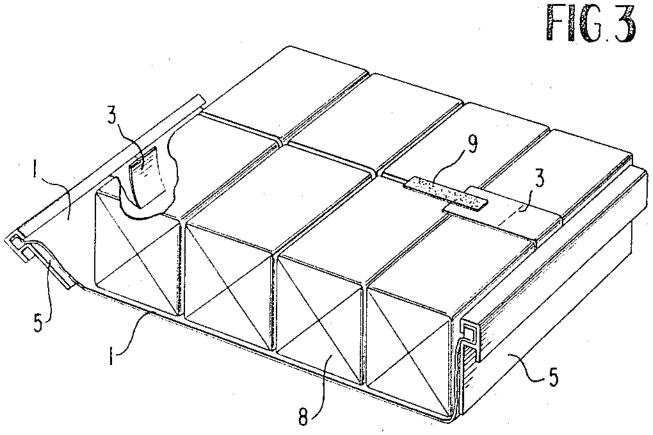
FIGURE 3 is a perspective view of a pallet in accordance with the present invention, partially assembled to a partial load.
Figures 7A, 7B, 7C, 7D, 7E:
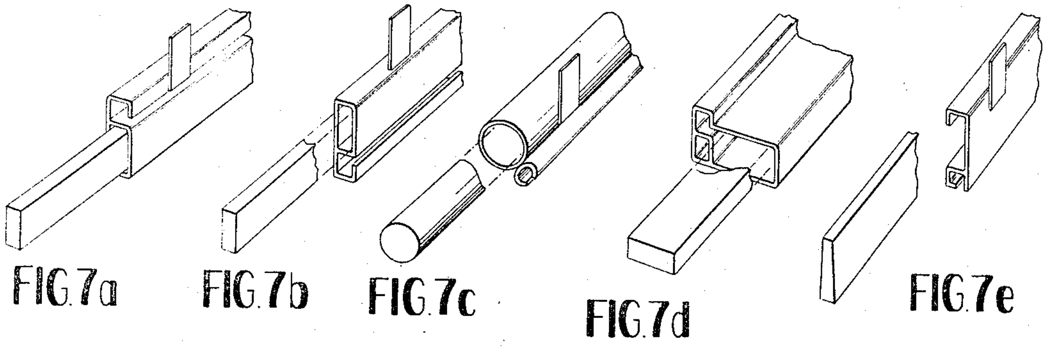

Turning now to FIGURE 3, a pallet in accordance with the present invention has been placed on a flat surface and one layer of material to be attached thereto has been placed on the load-supporting surface of the pallet. On the right hand side of FIGURE 3, the mandrel 5 has been placed in load-supporting position, and conveniently it may be held in this position during further loading by means of an adhesive strip 9 attached to the tab member 3 and to the load itself. After the left hand mandrel 5 of FIGURE 3 has been placed in the same position as the right hand one, additional loadings may be stacked on top of the first layer as shown in FIGURE 4, and the entire load secured to the pallet by means of the ties 7, which extend over the top of the load and between the two mandrels 5. Preferably, these tie means are formed of resilient material to facilitate their fastening and to insure a snug fit between the tie means and the load.

Turning now to FIGURE 5, this figure shows a pallet of the same general type described with reference to FIGURES 1 to 4 inclusive, but with a modified form of mandrel, which can be classed as a disposable mandrel. The pallet still comprises the basic sheet 1 with the battens 2 attached to opposite edges of the sheet, but in lieu of the channel-shaped mandrels of FIGURES 2 to 4 inclusive, a simple stiffening strip 12 is applied to the sheet 1 between the batten and the sheet so that the tines **10*a* and 11*a* of the fork lift truck will engage the sides of the stiffening strip 12 and the underside of the battens 2** in load-carrying position. Otherwise, the principle is entirely the same as in the embodiment previously described.

FIGURES 6*a* to 6*d* inclusive merely show alternate locations of the tie member 7 with respect to the batten 2.

FIGURES 7*a* to 7*e* inclusive merely show alternate structural forms of the mandrels of the type described with reference to FIGURE 2 and illustrate concurrently therewith different shapes of tines for the fork lift truck for engaging the respective mandrels.

FIGURES 8*a* to 8*d* inclusive merely show alternate forms of the channel structure for the mandrels of FIGURE 2.

FIGURE 9 shows a jig which is useful with pallets in accordance with the present invention in order to facilitate the placing of loads thereon. As shown in FIGURE 9, it will be seen that the jig includes a base member 20 which has a depression 21 formed in the upper surface thereof, said depression conforming substantially to the load area. The block or base 20 has attached thereto at its opposite edges a pair of wing members 23 and 24, which are hingedly connected to the base. In use, the unloaded pallet is placed on the platform and the flaps are raised which folds the sides of the pallet against the sides of the load.

FIGURE 10*a* merely shows a sling arrangement useful in conjunction with pallets constructed in accordance with the present invention in lieu of fork lift trucks.

FIGURE 10*b* is merely a plan view taken at 90° to the showing in FIGURE 10*a*.

From the foregoing, it will be apparent to those skilled in this art that there is herein shown and described a new and useful pallet structure, useful throughout the industry for easy and economic handling of palletized loads.

While preferred embodiments of the pallet in accordance with the present invention have been herein shown and described, applicant claims the benefit of a full range of equivalents within the scope of the appended claims.

I claim:

1. A flexible pallet for use with a fork lift truck or the like comprising:

(1) a main load-supporting body formed of flexible sheet material sized to underlie the load to be carried and to extend upwardly along opposite vertical sides thereof, said material being folded upon itself at opposite ends thereof with the ends secured to the main body to define a pair of spaced parallel pockets therein;

(2) a pair of rigid reinforcing members one secured in each said pocket;

(3) rigid mandrel means detachably connected to said ends of said sheet, adapted to be positioned on said two vertical sides of the load, and to be engaged by the tines of a lift fork;

(4) and tie means attached to said mandrels for encircling a load and securing it to said pallet.

2. The combination defined by claim 1 in which said tie means are formed of resilient material.

3. The combination defined by claim 1 in which said flexible sheet material is aluminum.

4. The combination defined by claim 1 in which said flexible material is aluminum covered with polyethylene.

References Cited

UNITED STATES PATENTS

| | | | |
|---|---|---|---|
| 2,226,294 | 12/1940 | Erickson | 108—51 |
| 2,698,696 | 1/1955 | Strong | 108—51 |
| 2,977,148 | 3/1961 | Ford | 108—51 X |
| 3,112,715 | 12/1963 | Callahan, et al. | 108—52 |

FOREIGN PATENTS

| | | |
|---|---|---|
| 800,453 | 8/1958 | Great Britain. |

DAVID J. WILLIAMOWSKY, *Primary Examiner.*

FRANK B. SHERRY, *Examiner.*

G. O. FINCH, *Assistant Examiner.*